US007222881B1

(12) United States Patent
Zhou

(10) Patent No.: US 7,222,881 B1
(45) Date of Patent: May 29, 2007

(54) STOP FOR AN ANTI-TIP WHEEL FOR A WHEELCHAIR

(75) Inventor: Daniel Z. Zhou, Clovis, CA (US)

(73) Assignee: Sunrise Medical HHG Inc., Longmont, CO (US)

( * ) Notice: Subject to any disclaimer, the term of this patent is extended or adjusted under 35 U.S.C. 154(b) by 337 days.

(21) Appl. No.: 10/832,951

(22) Filed: Apr. 27, 2004

(51) Int. Cl.
*B60R 21/13* (2006.01)

(52) U.S. Cl. .................................................... 280/755

(58) Field of Classification Search ................. 280/755
See application file for complete search history.

(56) References Cited

U.S. PATENT DOCUMENTS

| | | | | |
|---|---|---|---|---|
| 4,877,260 | A | 10/1989 | Howland | |
| 5,137,295 | A | 8/1992 | Peek | |
| 5,181,733 | A | 1/1993 | Tague | |
| 6,041,876 | A | 3/2000 | Pulver et al. | |
| 6,131,679 | A | 10/2000 | Pulver et al. | |
| 6,460,641 | B1 | 10/2002 | Kral | |
| 6,494,474 | B1 | 12/2002 | Kramer, Jr. | |
| 6,533,306 | B2 | 3/2003 | Watkins | |
| 6,543,798 | B2 | 4/2003 | Schaffner et al. | |
| 6,601,863 | B1 | 8/2003 | Mentessi et al. | |
| 6,688,437 | B2 | 2/2004 | Usherovich | |
| 6,851,711 | B2 * | 2/2005 | Goertzen et al. | 280/755 |
| 6,938,923 | B2 * | 9/2005 | Mulhern et al. | 280/755 |
| 2003/0201632 | A1 * | 10/2003 | Mulhern et al. | 280/755 |
| 2003/0205420 | A1 | 11/2003 | Mulhern et al. | |
| 2004/0094944 | A1 * | 5/2004 | Goertzen et al. | 280/755 |
| 2004/0188152 | A1 * | 9/2004 | Schaffner | 180/65.1 |
| 2006/0097478 | A1 * | 5/2006 | Goertzen et al. | 280/304.1 |

FOREIGN PATENT DOCUMENTS

| | | |
|---|---|---|
| WO | WO2004/016451 | 2/2004 |

* cited by examiner

*Primary Examiner*—Paul N. Dickson
*Assistant Examiner*—Barry Gooden, Jr.
(74) *Attorney, Agent, or Firm*—MacMillan, Sobanski & Todd, LLC

(57) ABSTRACT

An adjustable anti-tip stop for a wheelchair is disclosed.

19 Claims, 7 Drawing Sheets

STOP FOR AN ANTI-TIP WHEEL FOR A WHEELCHAIR

TECHNICAL FIELD

The present invention relates in general to wheelchairs and specifically to wheelchairs having anti-tip wheels. More particularly, the invention relates to the use of an anti-tip stop for limiting the range of motion the anti-tip wheels.

BACKGROUND OF THE INVENTION

Wheelchairs are land vehicles that are provided for transporting the physically impaired. Wheelchairs generally include a base frame supported on a supporting surface by a pair of idler wheels and a pair of drive wheels. The drive wheels may be manually driven by a wheelchair occupant or power driven by motors controlled by the wheelchair occupant. The wheelchair may be maneuvered by differentially driving the drive wheels. The idler wheels are generally in the form of casters, typically located in front of the drive wheels. The casters swivel to enhance the maneuverability of the wheelchair. Optionally, the wheelchair may include a pair of anti-tip wheels, typically located to rear of the drive wheels, which function to enhance the stability of the wheelchair.

The drive wheels have historically supported a rear portion of the wheelchair base frame while casters have supported a front portion of the wheelchair. However, the drive wheels of late have supported a front portion of the base frame as well. The former wheelchairs are commonly referred to as rear-wheel drive wheelchairs while the later wheelchairs are commonly referred to as mid-wheel drive wheelchairs. The casters of rear-wheel drive wheelchairs are typically located towards the front of the base frame. The casters of mid-wheel drive wheelchairs typically located towards the rear of the base frame.

Tipping is a potential problem with wheelchairs, and can occur when accelerating, or traversing obstacles or unlevel terrain. Tipping may also occur in wheelchairs that are provided with reclining seats. Anti-tip wheels are commonly attached to wheelchairs to reduce the risk of wheelchairs tipping over. Anti-tip wheels are usually attached to the rear end of rear-wheel drive wheelchairs and to the front end of mid-wheel drive wheelchairs. The anti-tip wheels are typically fixed in place or limited to a predetermined range of motion. This may have an undesirable affect on the operation of the wheelchair. For example, if the anti-tip wheels are fixed in place the mobility of the wheelchair may be impaired by the limited range of motion of the anti-tip wheels and make maneuverability difficult. Additionally, for example if the anti-tip wheels are limited to a predetermined range of motion and the range of motion is too large then the anti-tip wheels may fail to add stability since they would not provide resistance until after the wheelchair has become unstable. Conversely, if the range of motion is too small then the wheelchair may experience the same problems as when the anti-tip wheels are fixed in place.

It would be advantageous if there could be developed an improved anti-tip system that provides stability while maintaining the mobility and maneuverability of a wheelchair.

BRIEF SUMMARY OF THE INVENTION

An anti-tip adjustable stop for a wheelchair is disclosed.

According to the invention there is provided an anti-tip system for a wheelchair including an arm having an attachment end and a distal end, wherein the arm is pivotably mounted at the attachment end on a wheelchair frame. The wheelchair frame includes a wheelchair frame member. An anti-tip wheel is rotatably connected to the distal end of the arm, and a stop for limiting the range of motion of the arm relative to the wheelchair frame member is operably located between the arm and the frame member.

According to this invention there is also provided an arm having an attachment end, and a distal end, wherein the arm is pivotally mounted at the attachment end by a resilient hinge on a wheelchair frame, the wheelchair frame including a wheelchair frame member. An anti-tip wheel is rotatably connected to the distal end of the arm, wherein the arm includes a threaded bore. An adjustable stop for limiting the range of motion of the arm relative to the wheelchair frame member is also provided. The stop is operably located between the arm and the frame member, wherein the stop includes a threaded bolt, a lock nut and a resilient bumper, wherein the threaded bolt is disposed in the threaded bore.

According to the invention there is also provided a wheelchair having such an anti-tip system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
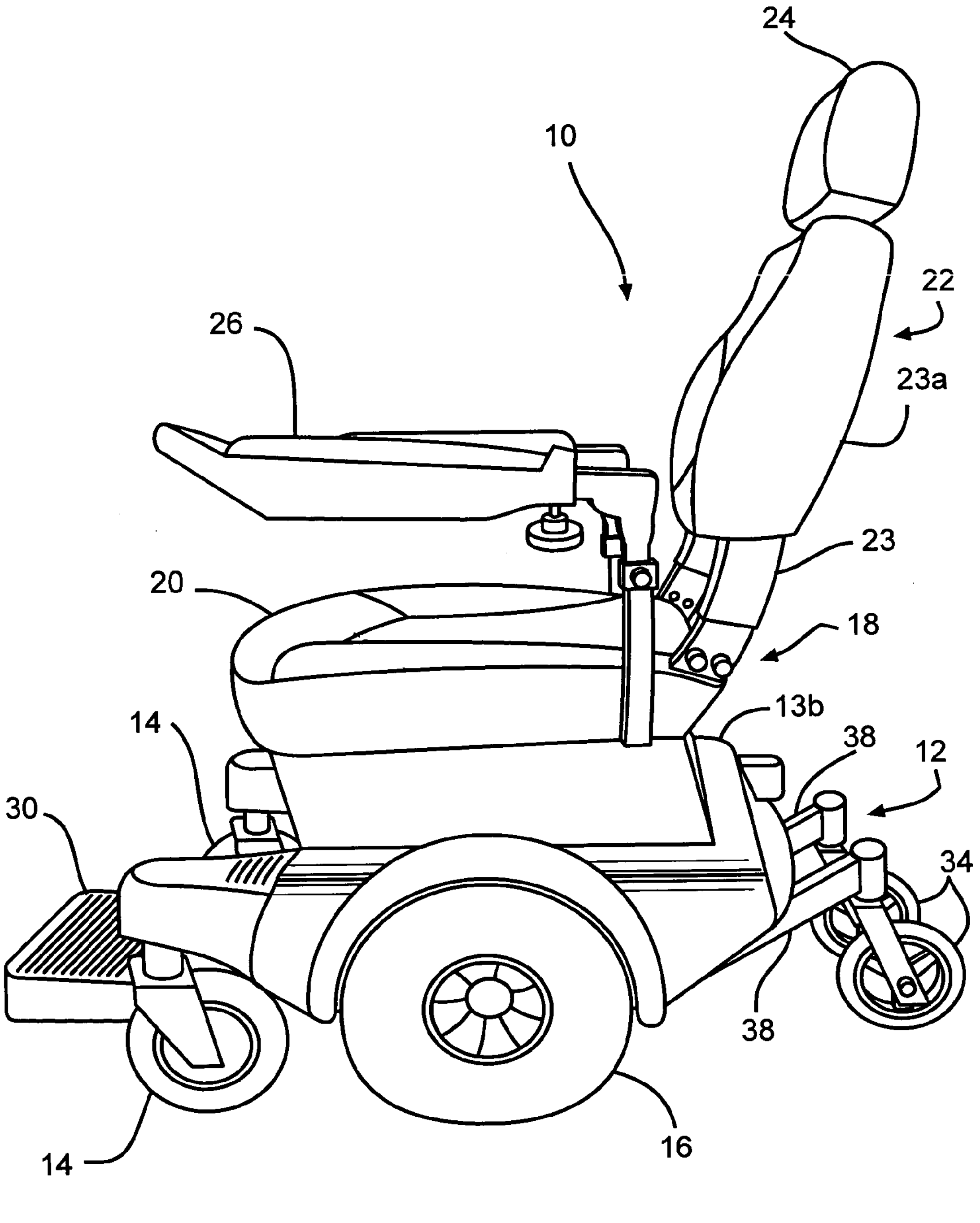
FIG. 1 is a side view in perspective of a wheelchair in accordance with the present invention.
Figure 2:
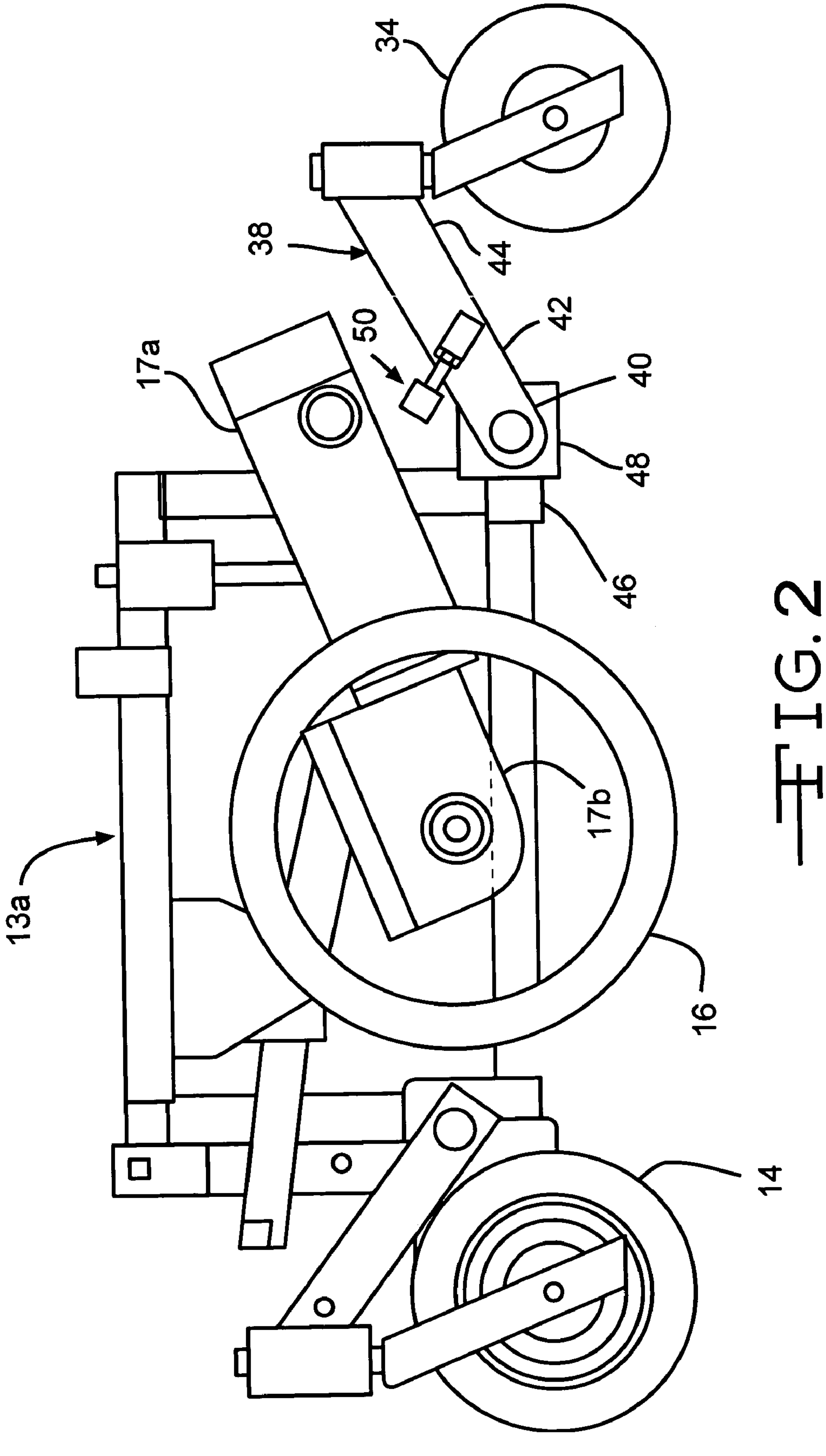
FIG. 2 is a side view in schematic of the base frame of the wheelchair of FIG. 1 with the cover removed.
Figure 3:
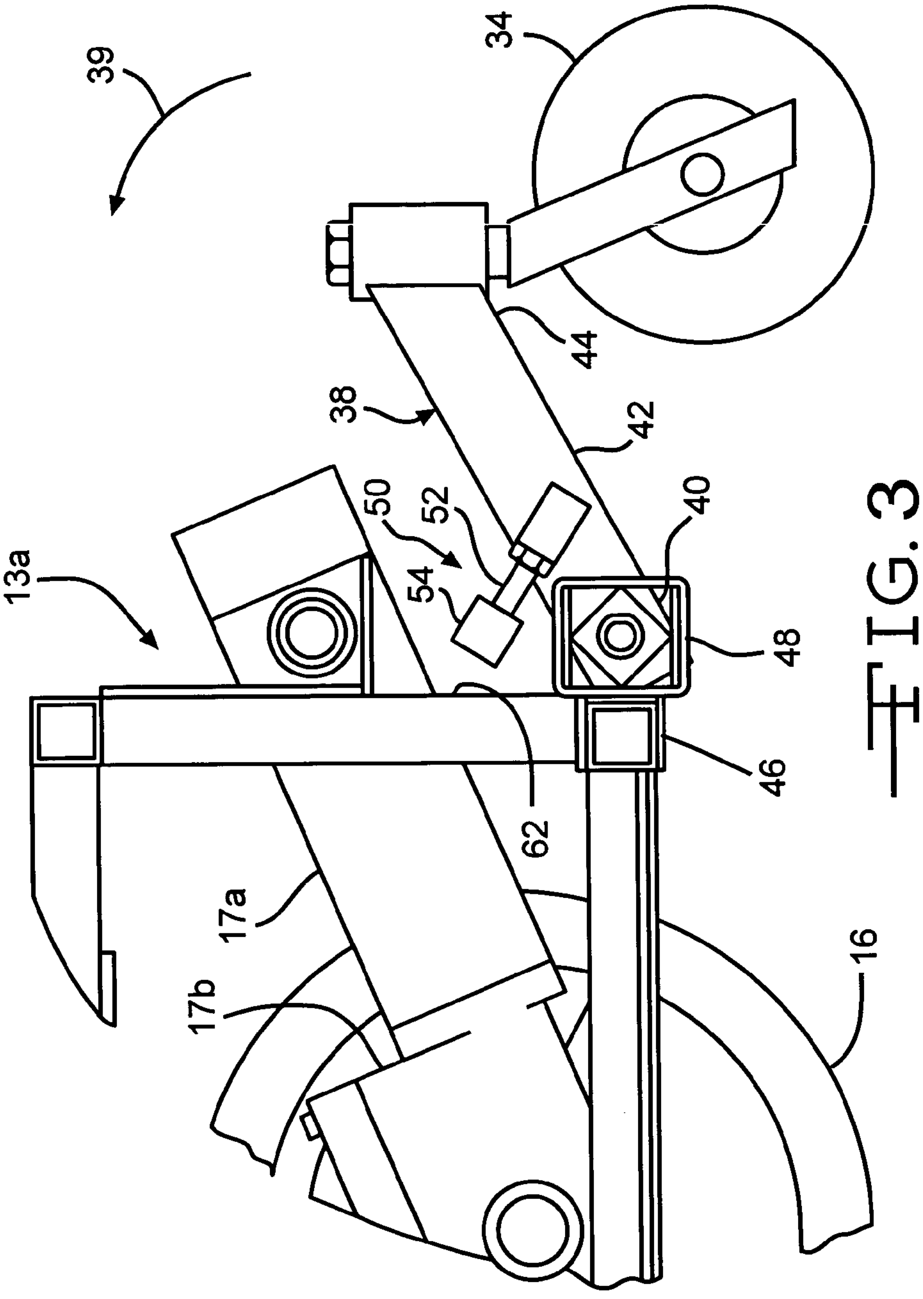
FIG. 3 is an enlarged view of a portion of the base frame of FIG. 2.

Referring now to the drawings, there is illustrated in FIG. 1 a wheelchair portion 12 includes a base frame 13*a* (as shown in FIGS. 2 and 3), which is mounted for movement on front caster wheels 14 and rear drive wheels 16. The base portion 12 also includes a cover 13*b*. The wheelchair is preferably provided with a drive motor 17*a* and a drive transmission 17*b* (as shown in FIGS. 2 and 3) for each of the drive wheels 16, and a source of power (not shown) for the drive motors 17*a*.

The wheelchair 10 includes a seat portion 18. The seat portion 18 includes a seat frame (not shown), which supports a seat cushion 20 for the support of an occupant. The wheelchair 10 includes a seat back 22. The seat back 22 includes a back frame 23 and a seat back cushion 23*a*, which provide support to the occupant's body. The wheelchair 10 also includes an optional headrest 24, which supports the occupant's head. The occupant's arms can be supported by armrests 26. A footrest 30 is provided and optional leg rests (not shown) may be provided.

As best seen in FIGS. 2 and 3, a pair of rear anti-tip wheels 34 is mounted on arms 38. It is to be understood that there could be just a single anti-tip wheel. Each arm 38 includes an attachment end 40, an intermediate portion 42, and a distal end 44. The attachment end 40 of the arm 38 is pivotably mounted at a pivot point 48 on the frame member 46, with the frame member 46 being part of the base frame 13*a*. The arm 38 may, however, be mounted at any appropriate frame member. The arm 38 is pivotably mounted so the arm 38 can "swing up", or pivot in a counter-clockwise direction as illustrated by an arrow 39 in FIG. 3, as will be described below. Preferably, the arm 38 is pivotably mounted upon the base frame 13*a* at the pivot point 48 by a resilient hinge connection 48*a*.

Figure 4:
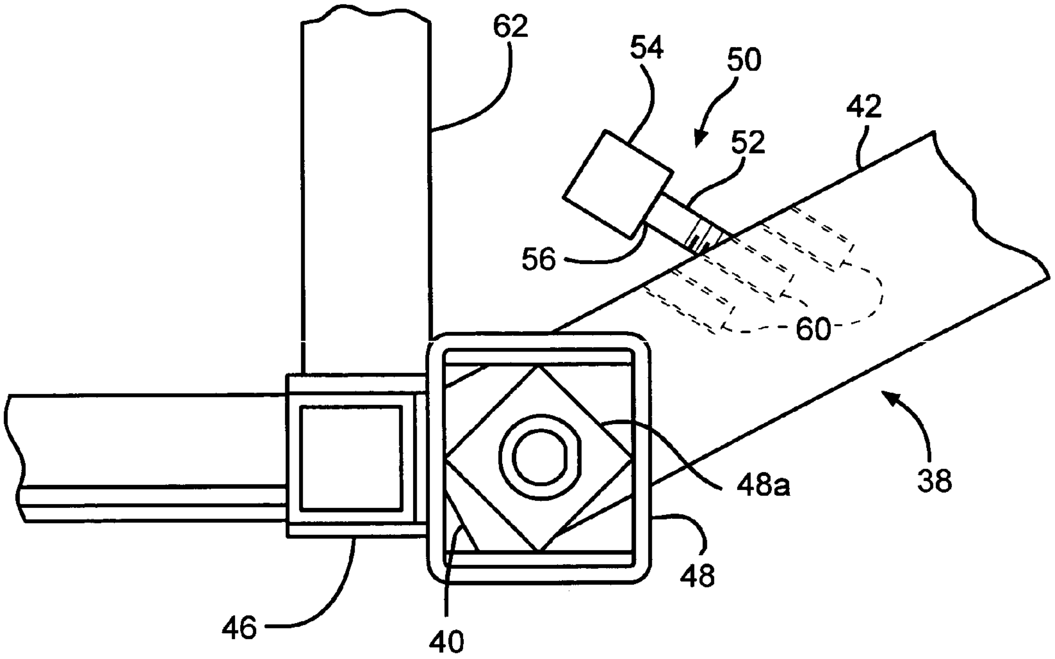
FIG. 4 is an enlarged view of the anti-tip system of FIG. 3.
Figure 5:
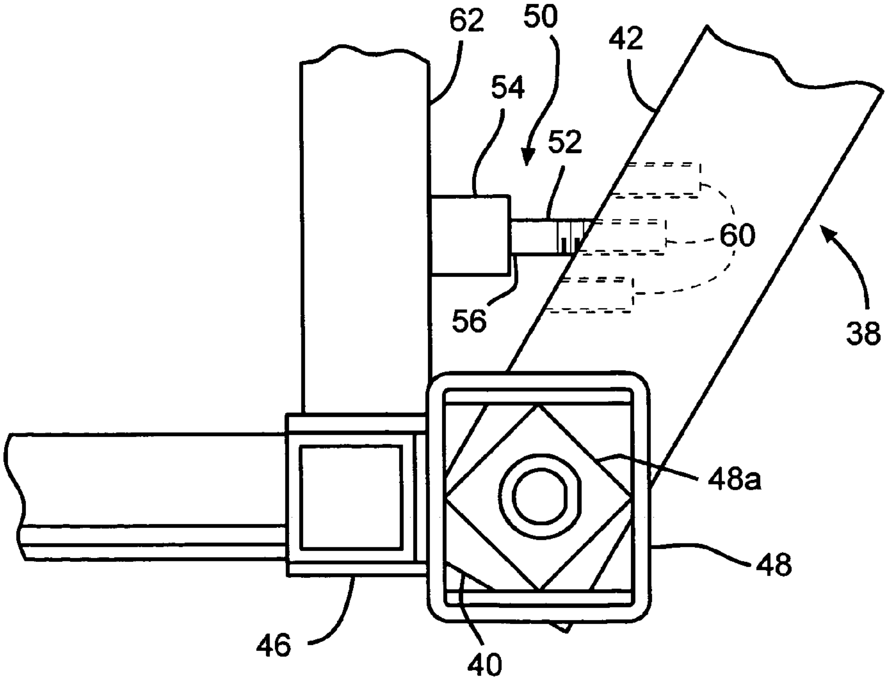
FIG. 5 is a view similar to that shown in FIG. 4, but with the stop, the arm and the frame member in an operably connected position.

The wheelchair 10 includes an adjustable stop 50. The stop 50 preferably includes a threaded bolt 52 and a bumper 54 on a first end 56 of the bolt 52, as shown in FIGS. 4 and 5. Preferably, the bumper 54 is a resilient bumper. For example, the bumper 54 may be made of rubber. The bumper 54 may, however, be made of any suitable material. The bumper 54 increases the smoothness of the ride as will be discussed below.

As shown in FIGS. 4 and 5, the stop 50 is preferably threadably connected to the arm 38 at a threaded bore 60 in the intermediate portion 42 of the arm 38. Most preferably, the arm 38 includes a plurality of threaded bores 60, each suitable to receive the threaded bolt 52 of the stop 50. As shown in FIG. 4, the stop 50 is operably located between the arm 38 and a frame member 62, generally meaning that the stop 50 is in a position between the arm 38 and the frame member 62 suitable to limit the range of motion of the arm 38 relative to the frame member 62. As shown in FIG. 4, there is space between the stop 50 and frame member 62 through the free range of motion of the arm 38. The frame member 62 can be any portion of the base frame 13*a* that is suitable for the stop 50 to engage. For further example, there is shown in FIG. 6 an alternative spacing arrangement with space between the sub-components of the stop 50.

When the arm 38 pivots, for example because of unlevel terrain or displacement of the occupant's weight, the arm 38 will pivot toward the frame member 62 of the base frame 13*a*. The arm 38 is pivotably mounted so that the arm 38 can "swing up" or pivot. The arm 38 is preferably pivotably mounted upon the base frame 13*a* at the pivot point 48 by the resilient hinge connection 48*a* so that there will be some resistance or resiliency to the "upward swing" or pivot of the arm 38. When the arm 38 reaches a predetermined position relative to the frame member 62, the stop 50 limits the range of motion of the arm 38, and in turn the anti-tip wheel 34, relative to the base frame 13*a*, thereby providing stability to the wheelchair 10. Thus, when the stop 50 limits the range of motion, the stop is operably connected to the arm 38 and the frame member 62. This means that the stop 50 is fully engaged, without space between the arm 38 and the frame member 62, to limit the range of motion of the arm 38 relative to the frame member 62. Thus, at some point in the "upward swing" or pivot, the resiliency effect reaches its limit and the arm 38 can pivot no farther. Thus, the stop 50 is operably connected to the arm 38 and the frame member 62, generally meaning that the stop 50 is in a position between the arm 38 and the frame member 62, without space there between, and limiting the range of motion of the arm 38 relative to the frame member 62. When the bumper 54 engages the frame member 62 the bumper 54 allows a small amount of additional travel while providing some resistance. Thus, the bumper 54 increases the smoothness of the ride by providing some resiliency to the stop 50 in addition to the resiliency of the hinge connection 48*a*.

The limit of the range of motion of the arm 38 relative to the frame member 62 may be adjusted by increasing or decreasing the extent to which the threaded bolt 52 is screwed into the treaded bore 60. This adjustment decreases or increases the distance of the bumper 54 from the arm 38, and thus decreases or increases the limit of the range of motion of the arm 38 and the rear anti-tip wheel 34. The limit of the range of motion may be further adjusted by selecting a different threaded bore 60 for the stop 50 to threadably engage. The use of the stop 50 thus allows the extent of the pivotal movement of the arm 38 to be readily adjusted to meet the needs of a particular wheelchair occupant or user.

Figure 6:
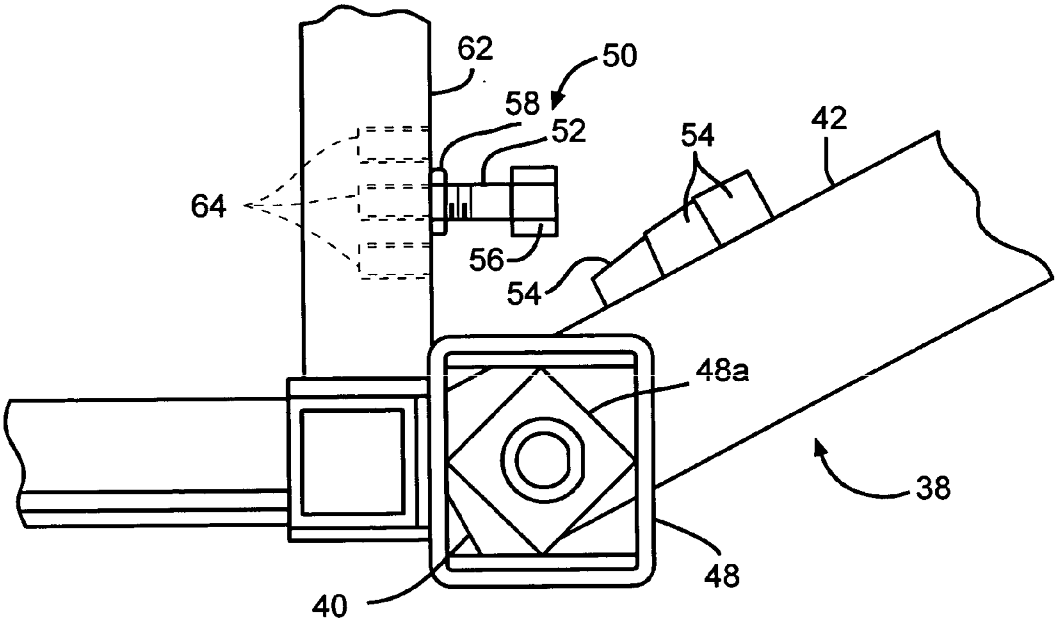
FIG. 6 is a view similar to that shown in FIG. 4, but showing a first alternative embodiment of the present invention.
Figure 7:
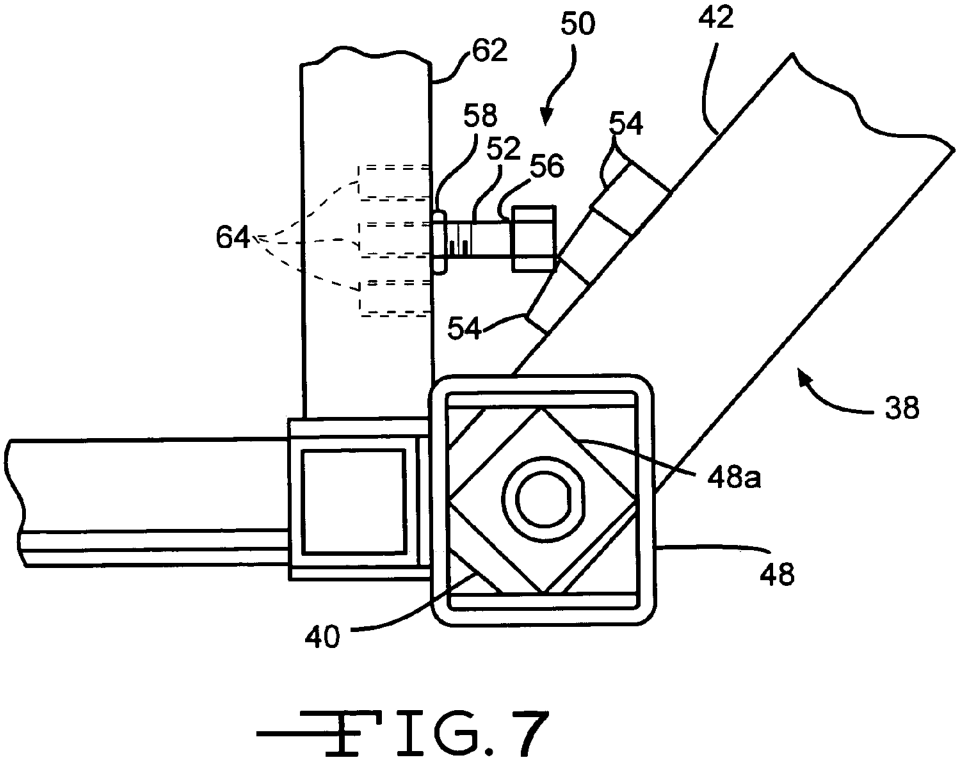
FIG. 7 is a view similar to that shown in FIG. 6, but with the stop, the arm and the frame member in an operably connected position.

As shown in FIGS. 6 and 7, the threaded bolt 52 of the stop 50 may optionally be threadably connected to the frame member 62, at a threaded bore 64. Further, the bumper 54 of the stop 50 may optionally be mounted on a separate part rather than being mounted on the bolt 52. For example, the bolt 52 can be mounted on the arm 38, with the bumper 54 mounted on the frame member 62. Alternatively, the bolt 52 can be mounted on the frame member 62, with the bumper 54 mounted on the arm 36. Thus, the bumper 54 can be placed on the one of the arm 38 and the frame member 62 to which the threaded bolt 52 is not connected. As shown in FIGS. 6 and 7 a plurality of bumpers 54 are connected to the arm 38. For example, the bumpers 54 may be connected to the arm 38 by adhesive, or by any suitable manner. Preferably, the frame member 62 includes a plurality of threaded bores 64, each suitable to receive the threaded bolt 52 of the stop 50. Most preferably, the location of each of the bumpers 54 corresponds to the location of one of the bores 64. Thus, when the bolt 52 is screwed into any of the bores 64, the stop 50, including the threaded bolt 52 and the corresponding bumper 54, is operably located between the arm 38 and the frame member 62. The stop 50 may optionally include a lock nut 58 in order to fix the extent to which the threaded bolt 52 is screwed into the frame member 62.

When the arm 38 pivots, for example because of unlevel terrain or displacement of the occupant's weight, the arm 38 will pivot toward a frame member 62 of the base frame 13*a*. As previously discussed, the arm 38 is pivotably mounted so that the arm 38 can "swing up" or pivot and preferably by the resilient hinge connection 48*a*. When the arm 38 reaches a predetermined position relative to the frame member 62 the bumper 54 engages the threaded bolt 52, thus the stop 50 is operably connected to the arm 38 and the frame member 62. The stop 50 thus limits the range of motion of the arm 38, and in turn the anti-tip wheel 34, relative to the base frame 13*a*, and provides stability to the wheelchair 10.

As discussed previously, the range of motion of the arm 38 relative to the frame member 62 may be adjusted by increasing or decreasing the extent to which of the threaded bolt 52 engages the treaded bore 64, in this case, thus decreasing or increasing the amount of the threaded bolt 52 extending from the frame member 62, and thus decreasing or increasing the range of motion. The limit of the range of motion may be further adjusted by selecting a different threaded bore 64 for the threaded bolt 52 to threadably engage. The lock nut 58 may then be adjusted toward the frame member 62 to secure the threaded bolt 52 in place, relative to the frame member 62. The use of the stop 50 thus allows the extent of the pivotal movement of the arm 38 to be readily adjusted to meet the needs of a particular wheelchair occupant or user.

Figure 8:
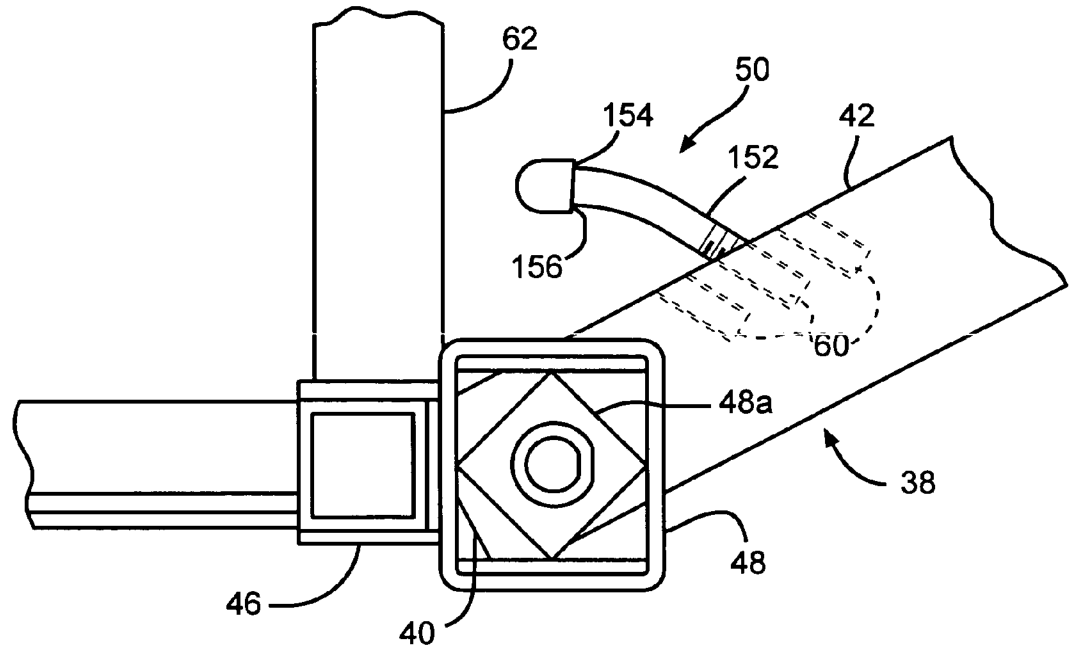
FIG. 8 is a view similar to that shown in FIG. 4, but showing a second alternative embodiment of the present invention.

FIG. 8 is a view of an embodiment similar to that shown in FIG. 4, similar elements or components are labeled with similar numbers. Although the preferred embodiment has been described with the threaded bolt 52, which is a straight bolt, an alternative embodiment includes a bolt 152, which is curved.

Figure 9:
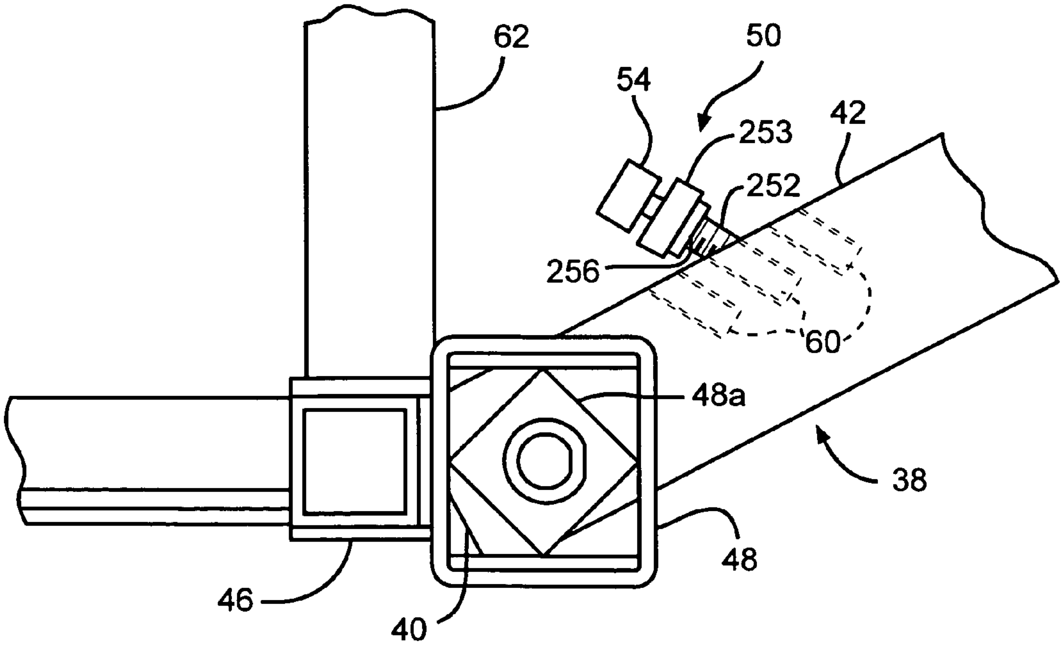
FIG. 9 is a view similar to that shown in FIG. 4, but showing a third alternative embodiment of the present invention.

FIG. 9 is a view similar to that shown in FIG. 4, and similar elements or components are labeled with similar numbers. Although the preferred embodiment has been described with the threaded bolt 52, an alternative embodiment includes a bolt 252 with a damper 253. The damper 253 is preferably a hydraulic shock absorber, however it must be understood that the damper 253 may be any suitable damper, such as a mechanical spring assembly or any other suitable damper.

Figure 10:
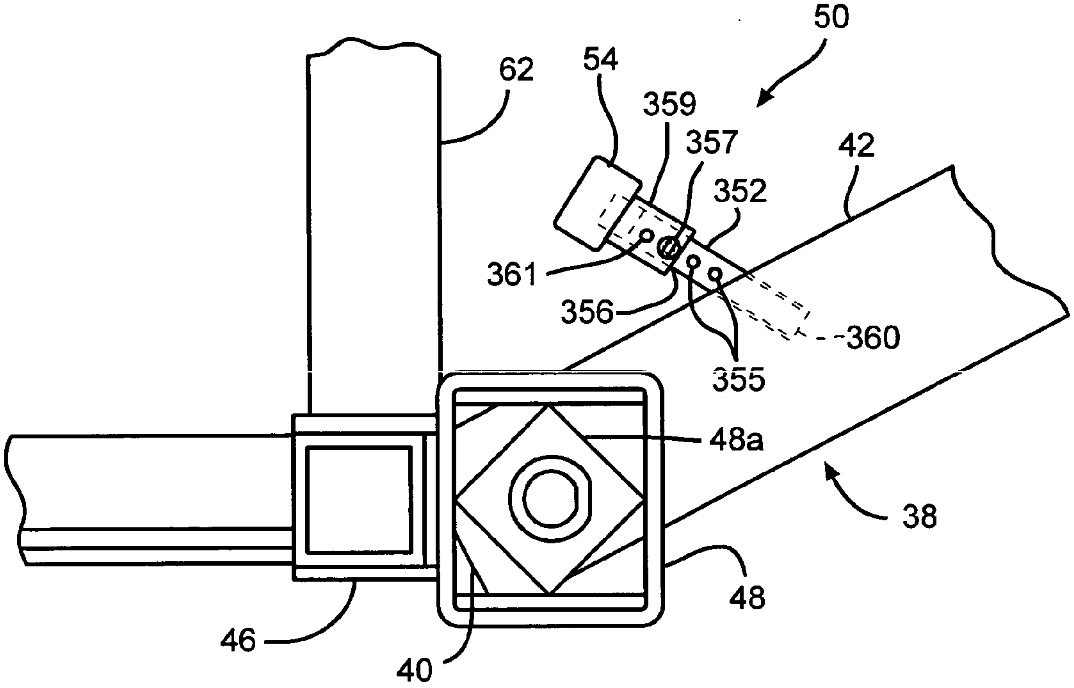
FIG. 10 is a view similar to that shown in FIG. 4, but showing a fourth alternative embodiment of the present invention.

FIG. 10 is a view similar to that shown in FIG. 4, and similar elements or components are labeled with similar numbers. The bumper 54 is connected to sleeve 359. The sleeve 359 includes a plurality of holes 361. The sleeve 359 slidably engages a rod 352. The rod 352 is preferably permanently fixed in a bore 360 in the arm 38. That is to say, that substantial damage would occur to either the rod 352 or the arm 38 if the rod 352 were to be removed from the arm 38. Alternatively, the rod 352 could be removable. The rod 352 includes a plurality of holes 355. A moveable retainer pin 357, for example a cotter pin, is disposed in aligned holes 361 and 355 as to secure the sleeve 359 relative to the rod 352. The limit of the range of motion of the arm 38 relative to the frame member 62 may be adjusted by increasing or decreasing the amount of the sleeve 359 engaging the rod 352, thus decreasing or increasing the distance of the bumper 54 from the arm 38, and thus decreasing or increasing the limit of the range of motion.

Figure 11:
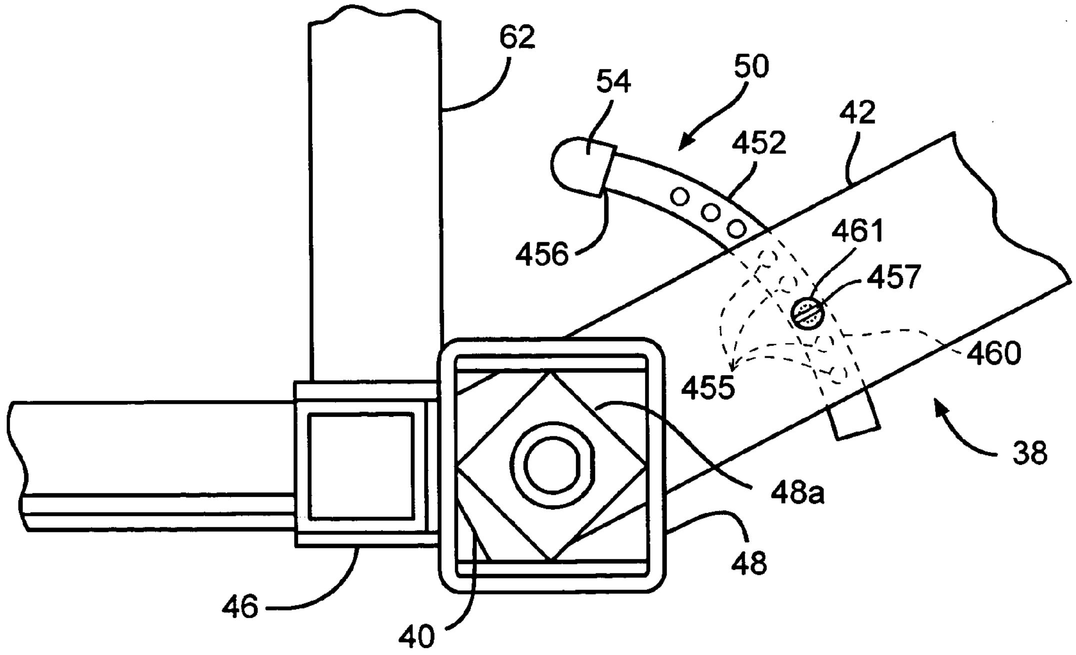
FIG. 11 is a view similar to that shown in FIG. 4, but showing a fifth alternative embodiment of the present invention.

FIG. 11 is a view similar to that shown in FIG. 4, with similar elements or components being labeled with similar numbers. A curved plate 452 is disposed in a curved bore 460 in the arm 38. The curved plate is generally arcuate shaped, but may be any suitable shape. The curved plate 452 includes a plurality of holes 455 and the arm 38 includes a hole 461. A retainer pin 457, such as a cotter pin, is disposed in the hole 461 and one of the holes 455 as to secure the curved plate 452 relative to the arm 38. The limit of the range of motion of the arm 38 relative to the frame member 62 may be adjusted by increasing or decreasing the amount of the curved plate 452 engaging the arm 38, thus decreasing or increasing the distance of the bumper 54 from the arm 38, and thus decreasing or increasing the limit of the range of motion.

While the invention has been described in its preferred embodiment with rear anti-tip wheels 34, it must be understood, however, that the anti-tip wheel 34 and the arm 38 may be placed in any suitable location upon the wheelchair 10. Further, while the invention has been illustrated in its preferred embodiment with the frame member 62 being a vertical frame member, it must be understood, however, that the frame member 62 may be any suitable frame member.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An anti-tip system for a wheelchair comprising:

an arm having an attachment end, and a distal end, wherein the arm is pivotably mounted at the attachment end on a wheelchair frame, the wheelchair frame including a wheelchair frame member, and wherein an anti-tip wheel is rotatably connected to the distal end of the arm; and an adjustable stop for limiting the range of motion of the arm relative to the wheelchair frame member, the stop being operably located between the arm and the frame member, wherein, when the stop is limiting the range of motion of the arm relative to the frame member, a face of the stop is in contact with a surface of one of the arm and the frame member, and when the stop is not limiting the range of motion of the arm relative to the frame member, the face of the stop is spaced apart from the surface of the one of the arm and the frame member.

2. The anti-tip system of claim 1 wherein the arm is pivotally connected to the frame by a resilient hinge.

3. The anti-tip system of claim 1 wherein the stop includes a threaded bolt.

4. The anti-tip system of claim 3 wherein the threaded bolt is a curved bolt.

5. The anti-tip system of claim 1 wherein the stop includes a bumper.

6. The anti-tip system of claim 5 wherein the bumper is a resilient bumper.

7. The anti-tip system of claim 3 wherein the stop further includes a lock nut.

8. The anti-tip system of claim 3 wherein the arm includes a threaded bore and wherein the threaded bolt is disposed in the bore in the arm.

9. The anti-tip system of claim 8 wherein the arm further includes an intermediate portion between the attachment end and the distal end, and further wherein there is a plurality of bores in the intermediate portion suitable to threadably receive the threaded bolt.

10. The anti-tip system of claim 3 wherein the frame member includes a threaded bore and wherein the threaded bolt is disposed in the bore in the frame member.

11. The anti-tip system of claim 1 wherein the stop includes a damper.

12. The anti-tip system of claim 11 wherein the damper is a hydraulic shock absorber.

13. The anti-tip system of claim 1 wherein the stop includes a sleeve and a rod.

14. The anti-tip system of claim 1 wherein the stop includes a curved plate.

15. An anti-tip system for a wheelchair comprising:

an arm having an attachment end, and a distal end, wherein the arm is pivotably mounted at the attachment end by a resilient hinge on a wheelchair frame, the wheelchair frame including a wheelchair frame member, and wherein an anti-tip wheel is rotatably connected to the distal end of the arm, wherein the arm includes a threaded bore; and an adjustable stop for limiting the range of motion of the arm relative to the wheelchair frame member, the stop being operably located between the arm and the frame member, wherein the stop includes a threaded bolt, a lock nut and a resilient bumper, wherein the threaded bolt is disposed in the threaded bore.

16. A power wheelchair comprising:

a frame having a frame member;

a seat mounted on the frame;

a motor mounted upon the frame for controlling and driving a pair of drive wheels supporting the frame;

an arm having an attachment end and a distal end, the attachment end being pivotally connected to the frame;

an anti-tip wheel rotatably connected to the distal end of the arm; and a stop for limiting the pivoting of the arm relative to the frame member, the stop being operably located between the arm and the frame member, and the stop being adjustable to change the range of motion of the anti-tip wheel, wherein a portion of the stop is disposed in a bore in the arm.

17. The anti-tip system of claim 16 wherein the stop includes a bolt, the bolt disposed in the bore.

18. The anti-tip system of claim 16 wherein the stop includes a resilient bumper.

19. The anti-tip system of claim 17 wherein the bore is a threaded bore and wherein the bolt is a threaded bolt disposed in the threaded bore.

* * * * *